United States Patent
Vezzani (10) Patent No.: US 12,478,072 B2
(45) Date of Patent: Nov. 25, 2025

(54) LACTOSE-CONTAINING PRODUCT IN POWDER FORM AND PRODUCTION PROCESS THEREOF

(71) Applicant: VOMM IMPIANTI E PROCESSI S.P.A., Rozzano (IT)

(72) Inventor: Massimo Vezzani, Rozzano (IT)

(73) Assignee: VOMM IMPIANTI E PROCESSI S.P.A., Rozzano (IT)

(*) Notice: Subject to any disclaimer, the term of this patent is extended or adjusted under 35 U.S.C. 154(b) by 759 days.

(21) Appl. No.: 17/756,665

(22) PCT Filed: Dec. 3, 2020

(86) PCT No.: PCT/EP2020/084458
§ 371 (c)(1),
(2) Date: May 31, 2022

(87) PCT Pub. No.: WO2021/110832
PCT Pub. Date: Jun. 10, 2021

(65) Prior Publication Data
US 2022/0408744 A1  Dec. 29, 2022

(30) Foreign Application Priority Data
Dec. 5, 2019 (IT) .......... 102019000023046

(51) Int. Cl.
 *A23C 1/01* (2006.01)
 *A23C 1/12* (2006.01)
 *A23C 21/06* (2006.01)
(52) U.S. Cl.
 CPC ............ *A23C 1/12* (2013.01); *A23C 1/01* (2013.01); *A23C 21/06* (2013.01); *A23V 2250/612* (2013.01)

(58) Field of Classification Search
 CPC ........... A23C 1/12; A23C 21/06; A23C 21/00; A23C 1/01–03; A23V 2250/612;
 (Continued)

(56) References Cited

U.S. PATENT DOCUMENTS

| 1,056,719 A | * | 3/1913 | Swenarton | ............... A23C 1/04 99/454 |
| 2,126,807 A | * | 8/1938 | Peebles | .................... C13K 5/00 426/388 |

(Continued)

FOREIGN PATENT DOCUMENTS

| EP | 0835679 A1 | 4/1998 |
| EP | 3421502 A1 | 1/2019 |
| WO | 2016016397 A1 | 2/2016 |

OTHER PUBLICATIONS

Milk Permeate NPL, https://www.thinkusadairy.org/products/permeate-(dairy-product-solids)/permeate-categories/whey-permeate (Year: 2018).*

(Continued)

*Primary Examiner* — Drew E Becker
(74) *Attorney, Agent, or Firm* — Silvia Salvadori, P.C.; Silvia Salvadori (57) ABSTRACT

A product in powder form having a dry matter content of at least 90% by weight on its total weight and containing lactose in a quantity of at least 85% by weight on its total weight, as well as having a high bulk density; moreover a process for the production of this product in powder form is disclosed, comprising the steps of vacuum-concentrating a lactose-containing liquid, mixing the so-concentrated liquid with a lactose-containing powder and with a high dry matter content and, finally, drying the so-obtained powdered mixture.

13 Claims, 4 Drawing Sheets

(58) Field of Classification Search
CPC ...... A23K 10/20; A23K 20/163; A23K 50/10; A23K 50/30; A23K 50/60; A23K 10/28; B01J 19/18; B01J 19/1887; Y02P 60/87; A23L 33/40; C13K 13/00; A23B 11/00
See application file for complete search history.

(56) References Cited

U.S. PATENT DOCUMENTS

| | | | | |
|---|---|---|---|---|
| 3,057,727 | A * | 10/1962 | Shields | A23C 9/16 |
| | | | | 426/388 |
| 3,425,135 | A * | 2/1969 | Langsetmo | H04N 9/802 |
| | | | | 34/182 |
| 4,141,783 | A * | 2/1979 | Pisecky | B05B 3/001 |
| | | | | 159/45 |
| 4,404,038 | A * | 9/1983 | Credoz | C13K 5/00 |
| | | | | 127/62 |
| 6,048,565 | A * | 4/2000 | Getler | A23C 1/00 |
| | | | | 99/453 |
| 6,391,361 | B1 * | 5/2002 | Peters | A23J 3/08 |
| | | | | 159/45 |
| 2003/0196957 | A1 * | 10/2003 | Henningfield | A23C 21/00 |
| | | | | 210/651 |
| 2003/0200672 | A1 * | 10/2003 | Keller | C13K 5/00 |
| | | | | 34/372 |
| 2008/0193623 | A1 | 8/2008 | Guerra-Gonzalez et al. | |
| 2008/0230051 | A1 * | 9/2008 | Bonke | A23C 1/04 |
| | | | | 127/16 |
| 2011/0034685 | A1 | 2/2011 | Lifran et al. | |
| 2014/0051850 | A1 * | 2/2014 | Styles | A23C 1/12 |
| | | | | 536/123.13 |
| 2019/0000099 | A1 * | 1/2019 | Keller | F26B 3/08 |
| 2019/0144955 | A1 * | 5/2019 | van Spronsen | B01D 9/04 |
| | | | | 127/55 |
| 2021/0106016 | A1 * | 4/2021 | Burt | B01D 1/225 |

OTHER PUBLICATIONS

Translation of WO 2016/016397A1 (Year: 2016).*
Office Action issued on Mar. 22, 2024 in counterpart European Application No. 20 816 208 1-1105.
Search Report and Written Opinion of PCT/EP2020/084458 of Feb. 17, 2021.
Tanguy G. et al., "Efficient process for the production of permeate powders", Innovative food Science and Emerging Technologies, vol. 41, Feb. 17, 2917, pp. 144-149.

* cited by examiner

LACTOSE-CONTAINING PRODUCT IN POWDER FORM AND PRODUCTION PROCESS THEREOF

This application is a U.S. national stage of PCT/EP2020/084458 filed on 5 Dec. 2020, which claims priority to and the benefit of Italian Patent Application No. 102019000023046 filed on 5 Dec. 2019, the contents of which are all incorporated herein by reference in their entireties.

FIELD OF APPLICATION

The present invention relates to a lactose-containing product in powder form, particularly a powder with a high dry matter content, deriving from a lactose-containing liquid, where the latter is a product or by-product of the milk-diary industry, such as whey.

The invention also relates to a process for obtaining the present lactose-containing product in powder form.

PRIOR ART

The market of powders deriving from liquid products or by-products of the milk-diary industry is steadily expanding, particularly for the production of infant milk for the nutrition of infants and livestock.

The powders deriving from liquid products or by-products of the milk-diary industry are also used in many products of the food industry, such as pastry products, industrial cheeses, dry mixtures for pancakes, cookies or drinks, soups, products based on sour milk, ice-creams and desserts.

These powders can be obtained from skimmed, semi-skimmed or whole milk, whey or permeated obtained by membrane filtration of milk or whey.

These powders are also widely used in places and/or situations where it is difficult to preserve or transport fresh milk since this food is transported more easily and preserved much longer in powder form with a high dry matter content.

The two main steps in the preparation of the powders being concerned are concentration and drying.

The concentration is carried out by evaporation, particularly by thin-film vacuum evaporation.

Normally, drying is carried out by pulverisation and spray-drying: the previously concentrated milk-diary liquid product is finely pulverised by the pressure exerted by a turbine or nozzle in a hot air flow (at about 150° C.-200° C.) inside a drying camera. The hot air serves as a heat and moisture carrier. Water evaporation occurs by instantaneous diffusion, which causes air cooling (up to about 90° C.).

More specifically, some traditional methods for producing milk-diary powders, starting from whey or permeated, obtained by membrane filtration of milk or whey, comprise the following steps:

1) product concentration up to 60% of dry extract by vacuum evaporation;
2) crystallization in tanks for a period of 4 to 12 hours, at a temperature comprised between 25° C. and 30° C.;
3) spray drying to obtain 96% of dry extract;
4) final drying up to 97% of dry extract, then cooling at a temperature which is lower than 35° C.;
5) granulometric distribution by sieving and milling.

It exists a variant of the traditional method consisting in performing spray drying up to 88% of dry extract (instead of 96% of dry extract) and then carrying out a second belt crystallization stage at room temperature, before the final drying step up to 97% of dry extract.

The main disadvantage of these methods is the fact of requiring a spray drying step.

In fact, this step represents the most energy-consuming operation between these processes for the production of powders starting from liquid products or by-products of the milk-diary industry: this step can in fact represent from 25% to 60% of the total energy cost of the energy of these processes.

In order to overcome this drawback, some alternative processes were provided in the prior art.

Another process called "Tixotherm® process" is characterized in that the ultra-concentration and crystallization steps are performed simultaneously, in the same apparatus. The starting material is composed for 60% of dry extract and it is treated for producing, in a crystalized form, a concentrate with 87% of dry extract. The concentrate is in the form of a paste that is cooled, dried on a fluid bed until a concentrate is obtained having 98% of dry extract. This process is described in the publication of J. Pisecky (Spray Drying in the Cheese Industry, Int. Dairy J. (2005), 15: 531-536) and in the patent application WO 03/086091.

This process has the disadvantage to lead to obtaining a product in the form of a pasty concentrate and not of a powder. With the Tixotherm® process, the concentration step up to 87% of dry extract must be performed at a very high temperature, which can involve the denaturation of milk proteins, particularly whey proteins, contained in the final treated products.

Moreover, the product obtained through the process being concerned tends to form aggregates, which is not desirable at all, especially for some specific applications for a lactose-containing product having a high dry matter content.

The patent application WO 2016/016397 in the name of the Applicant of the present application and the publication "Efficient process for the production of permeate powders" of Tanguy G. et al. disclose a process for obtaining a lactose-containing powder, comprising the following steps:

a) concentration of a lactose-containing liquid to obtain a concentrated liquid having a matter content comprised between 55% and 65%;
b) ultra-concentration of the concentrate obtained at the end of step a) to obtain an ultra-concentrate having a dry matter content comprised between 75% and 80%;
c) granulation of the ultra-concentrate obtained at the end of step b) by mixing the ultra-concentrate with a lactose-containing powder having a dry matter content of at least 95%, until a powder is obtained having an overall dry matter content of at least 85%; and,
d) drying the powder obtained at the end of step c) to obtain a lactose-containing powder having a dry matter content of at least 95%.

Specifically, step b) of the method being concerned can comprise the following sub-steps:

an ultra-concentration sub-step b1) of the concentrate obtained at the end of step a); and,
a crystallization sub-step b2) of the concentrate obtained in step a) and/or of the ultra-concentrate obtained at the end of sub-step b1), depending on whether step b2) takes place before, simultaneously or after step b1);

wherein the process being concerned does not comprise any spray drying step.

The lactose-containing powder which can be obtained through the process being concerned, in the event that the lactose-containing liquid used in the concentration step a) is whey, has a dispersed bulk density of 616 kg/m$^3$.

In the event that the lactose-containing liquid used in step a) is a permeated obtained by membrane filtration of milk, the lactose-containing powder which can be obtained through the process being concerned has instead a dispersed bulk density of 527 kg/m³.

These dispersed bulk density values are substantially in line with those of the lactose-containing powdered products available on the market which have a dispersed bulk density of 600 kg/m3 or lower, when the processed lactose-containing liquid is whey.

For example, standard lactose-containing powdered products can be obtained by carrying out the procedure disclosed in US 2008/193623 A1.

US 2008/193623 A1 discloses a crystallization process for milk-derived powders comprising a spray-drying step d), which involves the already mentioned drawbacks with regard to high energy consume and low dispersed bulk density of the final product.

Therefore, it is particularly felt the need to obtain powders deriving from a lactose-containing liquid, particularly from whey or from a permeated obtained by membrane filtration of milk or whey, having a high dry matter content and a bulk density which is higher than that of lactose-based powders available on the market and those which can be obtained through the process disclosed in the patent application WO 2016/016397.

In conclusion, in view of the state of the art and of the above-mentioned drawbacks, the problem underlying the present invention is to provide a product in powder form comprising lactose and having a high dry matter content, deriving from a lactose-containing liquid, wherein the latter is a product or by-product of the milk-diary industry, such as whey, wherein this product has improved chemical-physical features compared to similar products with reference to the prior art, among which a very high bulk density.

SUMMARY OF THE INVENTION

The above problem was solved by providing a product in powder form having a dry matter content of at least 90% by weight on its total weight and comprising lactose in a quantity of at least 85% by weight on its total weight, wherein this product has a dispersed bulk density which is higher or equal to 0.65 g/cm³.

In an equally preferred manner, the present product has a dispersed bulk density which is higher or equal to 0.69 g/cm³.

Pursuant to the present invention the expression "dispersed bulk density" means the measurement of the quantity of particles, granules or agglomerates thereof, which compose the product according to the invention, contained in a determined measured volume, including the gaps between the particles themselves, as well as the pores and the empty space therein, when a determined product quantity is poured into a container with this desired volume, after passing through a static sieve.

The sieve mesh must be large enough to prevent the formation of product arches which could obstruct the holes thereof.

Accordingly, consistently with the increased dispersed bulk density characterizing it, the product according to the present invention comprises particles with a reduced percentage of air inclusion.

The product in powder form according to the invention has a higher dispersed bulk density compared to similar powders with reference to the prior art, determining a series of advantages among which a lower hygroscopicity.

The last feature is particularly advantageous since it determines a marked tendency of the present product to keep its own rheological features during its preservation period (avoiding, for example, the agglomeration over time in particles having a coarser grain); in essence, the product according to the present invention has an extended shelf-life compared to that of similar products with reference to the prior art.

Concurrently, compared to similar powders with reference to the prior art, undesirable phenomena are avoided during the dissolution in water of the product according to the present invention or solid compositions comprising the same, such as the formation of clots.

Moreover, it must be stated that a product in powder form with a high dispersed bulk density involves a reduction of packaging, transport and storage costs.

In fact, by occupying a smaller volume for the same weight, during handling and transport of the product in powder form according to the present invention it is possible to achieve a considerable saving in terms of transport costs, compared to similar powdered products with reference to the prior art.

Preferably, the product in powder form according to the present invention has a dry matter content between 90% and 99% by weight on its total weight, more preferably between 97% and 99% by weight on its total weight.

Preferably, the present product in powder form comprises lactose in a quantity of at least 90% by weight on its total weight.

In a completely preferred manner, the present product comprises lactose in a quantity of at least 95% by weight on its total weight, more preferably of at least 96.5% by weight on its total weight, still more preferably of at least 97% by weight on its total weight.

Preferably, the present product in powder form has a particle size comprised between 30 µm and 400 µm, more preferably a particle size comprised between 40 µm and 100 µm.

Pursuant to the present invention the term "particle size" means the arithmetical mean of the diameter (or greater size) of the solid particles composing the product in powder form according to the present invention.

The product in powder form according to the present invention is obtained starting from a product or by-product of the milk-diary industry, preferably skimmed, semi-skimmed or whole milk, whey or permeated, obtained by membrane filtration of milk or whey.

Pursuant to the present invention, the term "lactose" means in general any anomeric form of lactose, that is alfa-lactose, beta-lactose or any combination thereof. The term "lactose" also means any solvated form of lactose, particularly any hydrated form thereof, as well as any derivative, adduct or complex of lactose with other substances, ions or molecules, in particular which might be present or added in this product or by-product of the milk-diary industry.

More preferably, the present product in powder form is whey powder.

More preferably, in the case of whey powder, the product in powder form according to the present invention has an hygroscopicity comprised between 0.70% and 1.30%, preferably between 0.95% and 1.15%, calculated as a percentage weight increase of absorbed water on the total weight of a product sample which is first lyophilized and then placed in an environment having a relative humidity of 50% at the temperature of 23° C. for a time of 60 minutes.

Specifically, the measurement of hygroscopicity was carried out by the following procedure:

lyophilization of the sample for a time of 48 hours;

measurement of the weight of the so-lyophilized sample;
conservation of the sample in an environment having a relative humidity of 50% and a temperature of 23° C., for a time of 60 minutes;
measurement of the weight of the so-obtained sample and calculation of the water absorption degree.

As it will be seen in greater detail with reference to the detailed description, the hygroscopicity, that is the water absorption degree, of the product in powder form according to the present invention, in the case of whey powder, is absolutely lower than that of similar products with reference to the prior art.

Moreover, in the case of whey powder, the product in powder form according to the present invention has a specific surface area (BET) comprised between 0.95 and 1.1 $m^2/g$, as calculated in accordance with the method USP 42 (United States Pharmacopeia, *Physical Tests, Specific Surface Area, Volumetric Method*).

In other words, as it will be seen hereafter with reference to the detailed description, particularly in the case of whey powder, the product in powder form according to the invention has a specific surface area which is markedly lower than that of similar products with reference to the prior art.

Furthermore, in the case of whey powder, the product in powder form according to the present invention can have a melting enthalpy comprised between −105.0 J/g and −125 J/g, more preferably between −110 J/g and −115 J/g, as calculated according to the DSC (Differential Scanning calorimetry) technique under nitrogen atmosphere.

As it will be widely seen with reference to the detailed description, the product in powder form according to the invention has a melting enthalpy which is higher than that of similar products with reference to the prior art and, advantageously, the present product in powder form has a just as high degree of crystallinity, being the last feature strictly related with the melting enthalpy.

In essence, the product in powder form according to the present invention contains lactose with a high degree of crystallinity, proving to be a high-quality product.

Moreover, the above problem was solved by providing a process for obtaining the lactose-containing product in powder form according to the present invention, which comprises the steps of:
a) providing a lactose-containing liquid having a dry matter content comprised between 18% and 65% by weight on its total weight;
b) concentrating this lactose-containing liquid at a temperature comprised between 55° C. and 200° C. for a time comprised between 1 minute and 10 minutes and at a pressure which is lower or equal to 20000 Pa, until an over-concentrated fluid product having a dry matter content comprised between 50% and 80% by weight on its total weight is obtained;
c) mixing the over-concentrated fluid product obtained by the previous step by mixing this over-concentrated fluid product with a lactose-containing powder having a dry matter content of at least 95% by weight on the total weight of this lactose-containing powder, until a powdered mixture is obtained having a dry matter content of at least 85% by weight on its total weight;
d) drying this powdered mixture until a product in powder form having a dry matter content of at least 90% by weight on its total weight and containing lactose in a quantity of at least 85% by weight on its total weight is obtained;

wherein this concentration step b) is performed in a turbo-concentrator and, more precisely, it comprises in turn the following steps:
providing a turbo-concentrator comprising a cylindrical tubular body having at least one inlet opening and at least one discharge opening, a heating jacket to bring this cylindrical tubular body to a predetermined temperature value, and a rotor, arranged in the cylindrical tubular body and comprising a shaft provided with elements radially projecting therefrom;
supplying a continuous flow of the above-mentioned lactose-containing liquid in this turbo-concentrator, so as to form, through the action of this rotor, a turbulent film continuous flow;
centrifuging this lactose-containing liquid against the inner wall of this turbo-concentrator, this rotor being driven into rotation at a speed which is higher or equal to 100 rpm with formation of a highly turbulent, dynamic, thin tubular fluid film, the turbulent film of this lactose-containing liquid advancing in substantial contact with the inner wall of the turbo-concentrator towards the discharge opening, so as to obtain the above-mentioned over-concentrated fluid product; and,
discharging from this discharge opening a continuous flow of over-concentrated fluid product.

As it will be shown in greater detail with reference to the detailed description, the present process allows the product according to the present invention to be obtained in an absolutely unexceptionable manner.

Specifically, concentration step b) has been found to be critical for the formation of the final lactose-containing product according to the present invention, namely a lactose-containing powder having high dry matter, high lactose concentration and, in particular, a dispersed bulk density, higher than similar product with reference to the prior art.

More specifically, step b) is performed in a turbo-concentrator at a given temperature comprised between 55° C. and 200° C., for a time comprised between 1 minute and 10 minutes and at a pressure which is lower or equal to 20000 Pa; these operating conditions are of fundamental importance in order to obtain the aforementioned final product.

Indeed, as it is shown in the drawings and in the following examples, carrying out the concentration step b) at a pressure well lower than ambient pressure allows to improve the crystal formation process, thereby obtaining fully-formed crystals which have an augmented size and a more homogenous and compact morphology, if compared, for example, with crystals as obtained by means of a crystallization process comprising a turbo-concentration step at ambient pressure or a spray-drying step.

Accordingly, by virtue of its homogenous and compact morphology, the powder product obtained by the process of the invention has a high dispersed bulk density, higher than similar powders with reference to the prior art.

Preferably, the lactose-containing liquid provided during the above-mentioned step a) is a concentrated liquid having a dry matter content comprised between 55% and 65% by weight on its total weight and it is obtained by a preliminary concentration step, more preferably performed by a preliminary vacuum concentration step and using a falling film tubular evaporator, at a temperature comprised between 45° C. and 75° C. and for a time comprised between 10 minutes and 20 minutes.

In a completely preferred manner, the evaporator used during the above-mentioned preliminary concentration step is a multiple-effect evaporator.

More particularly, this preliminary concentration step can be performed under vacuum and in a multiple-effect evaporator.

Pursuant to the present invention, this multiple-effect evaporator can be a continuous flow evaporator, in counter-current or in equicurrent. Hence, a multiple-effect evaporator according to the invention comprises at least two evaporators in fluid communication with each other and arranged in series. As it is known, the use of the steam generated in an evaporator (i) as a heating steam in the following evaporator (i+1) advantageously allows energy to be saved. In particular, the temperature at which the above-mentioned step a) is performed can follow a decreasing temperature gradient from the first evaporator to the latter of the series.

According to an alternative embodiment, the lactose-containing liquid provided during the above-mentioned step a) is a concentrated liquid having a dry matter content comprised between 55% and 65% by weight on its total weight and it is obtained by a preliminary vacuum concentration step, performed by membrane filtration.

Preferably, the lactose-containing liquid provided during the above-mentioned step a) or subjected to the above-mentioned preliminary concentration step is a product or by-product of the milk-diary industry, more preferably, skimmed, semi-skimmed or whole milk, whey or permeated, obtained by membrane filtration of milk or whey.

In a completely preferred manner, the lactose-containing liquid provided during the above-mentioned step a) or subjected to the above-mentioned preliminary concentration step is whey.

In an equally preferred manner, this concentration step b) is carried out at a pressure comprised between 15000 Pa and 11000 Pa.

Preferably, the above-mentioned concentration step b) is carried out at a temperature comprised between 55° C. and 120° C., more preferably between 55° C. and 80° C.

Indeed, according to this latter embodiment, said concentration step b) can be carried out at a temperature which is lower than the operating temperature of corresponding steps of the aforementioned prior art processes.

In an advantageous manner, when said concentration step b) is carried out at low temperature, any possible degradation processes are avoided and, from the nutritional point of view, an absolutely genuine product can be obtained.

Preferably, in the above-mentioned centrifugation step of this concentration step b) this rotor can be driven into rotation at a speed comprised between 200 rpm and 1000 rpm.

In a completely advantageous manner, the above process allows the product in powder form according to the present invention to be obtained by decreasing the number of overall steps required with reference to the processes according to the prior art.

In particular, according to the present process, it is possible to concentrate a lactose-containing liquid having a relatively low dry matter content, that is comprised between 18% and 65%, without necessarily performing a first concentration step followed by a second ultra-concentration step with reference to the prior art.

Therefore, in a completely advantageous manner, the present process can be carried out inside a more compact plant, having a lower number of operating units and being capable of consuming a reduced quantity of energy, compared to the processes according to the prior art.

Preferably, in the above-mentioned centrifugation step of this concentration step b) a hot thermal exchange fluid circulates inside this heating jacket of the turbo-concentrator, so as to bring this cylindrical tubular body to a predetermined temperature value, more preferably this thermal exchange fluid is diathermic oil.

In particular, the aforementioned over-overconcentrated product is in form of a high viscosity fluid.

In an advantageous manner, according to the present process, when such highly viscous fluid is then subjected to following steps c) and d), nucleation, formation of crystals and, accordingly, evaporation of water can be controlled.

Preferably, during the above-mentioned mixing step c) the over-concentrated fluid product obtained by the previous step is mixed with a lactose-containing powder having a dry matter content of at least 97% by weight on its total weight.

More preferably, this lactose-containing powder has a lactose content of at least 95%, still more preferably at least 97%, by weight on its total weight.

In accordance with a preferred embodiment, during the above-mentioned mixing step c) the over-concentrated fluid product obtained by the concentration step b) is mixed with lactose-containing powder produced during the drying step d) of a previous cycle for carrying out the production process according to the invention.

Preferably, the mixing step c) according to the present invention can be performed for a time comprised between 1 minute and 10 minutes.

More preferably, the mixing step c) according to the present invention can be carried out at a temperature of at least 15° C., still more preferably between 20° C. and 30° C.

Preferably, in said drying step d) the above-mentioned lactose-containing product in powder form has a dry matter content comprised between 90% and 99% by weight on its total weight, for example of 95%, more preferably comprised between 97% and 99% by weight on its total weight; still more preferably said product in powder form comprises lactose in a quantity of at least 95% by weight on its total weight.

According to a further embodiment, this drying step d) can be performed in a turbo-dryer, preferably this drying step d) comprises in turn the following steps:

providing a turbo-dryer comprising a cylindrical tubular body having at least one inlet opening and at least one discharge opening, a heating jacket to bring this cylindrical tubular body to a predetermined temperature value, and a rotor, arranged in the cylindrical tubular body and comprising a shaft provided with elements radially projecting therefrom;

supplying a continuous flow of the above-mentioned powdered mixture in this turbo-dryer;

centrifuging this powdered mixture against the inner wall of the turbo-dryer, this rotor being driven into rotation at a speed which is higher or equal to 100 rpm, preferably comprised between 200 rpm and 800 rpm, the particles of the powdered mixture advancing in substantial contact with the inner wall of the turbo-dryer towards the discharge opening, so as to form the above-mentioned product in powder form; and, discharging from this discharge opening this product in powder form.

Preferably, during the above-mentioned centrifugation step a hot thermal exchange fluid circulates inside the heating jacket of the turbo-dryer, so as to bring this cylindrical tubular body to a predetermined temperature value, more preferably this thermal exchange fluid is diathermic oil.

In an advantageous manner, when this drying step d) is carried out in a turbo-dryer, the evaporation of water can be efficiently controlled by regulating the temperature of the cylindrical tubular body, thereby promoting the formation a crystalline product.

More particularly, this drying step d) can be carried out bringing the above-mentioned cylindrical tubular body of the turbo-dryer to a temperature comprised between 40° C. and 200° C. by heating the inner wall through this heating jacket.

Preferably, during this drying step d) this continuous flow of powdered mixture is put in contact with an air flow heated at a temperature comprised between 100° C. and 200° C.

Preferably, this heated air flow is in equicurrent with respect to the above-mentioned continuous flow of powdered mixture.

Advantageously, in accordance with this last variant of the present process, this continuous flow of powdered mixture is dried in an even more effective manner.

Preferably, this drying step d) can be carried out at a temperature comprised between 100° C. and 200° C., preferably for a time comprised between 1 minute and 10 minutes.

More preferably, the above-mentioned drying step d) is performed at the atmospheric pressure.

According to a further embodiment of the present process, following the above-mentioned drying step d) this product in powder form can be sieved and/or milled.

Specifically, following the drying step d) this product in powder form can be sieved through a screen for separating a fraction of finer powder from a fraction of coarser powder, wherein this fraction of coarser powder can be milled inside a mill and then gathered with this fraction of fine powder.

According to a preferred embodiment, the process according to the present invention can be carried out continuously.

According to another aspect, the present invention also concerns the use in the field of food or animal feed industry of the above-mentioned product in powder form comprising lactose and having a high dry matter content, preferably the use of the present product in powder form for the preparation of a composition for human or animal nutrition, still more preferably for the preparation of infant milk in powder form for the nutrition of infants or livestock.

The advantages and the typical features of the present invention will be more apparent from the detailed description, given herebelow by way of non-limiting illustration of preferred embodiments of the present invention, with reference to the attached figures.

DETAILED DESCRIPTION OF A PREFERRED EMBODIMENT

Figure 1:
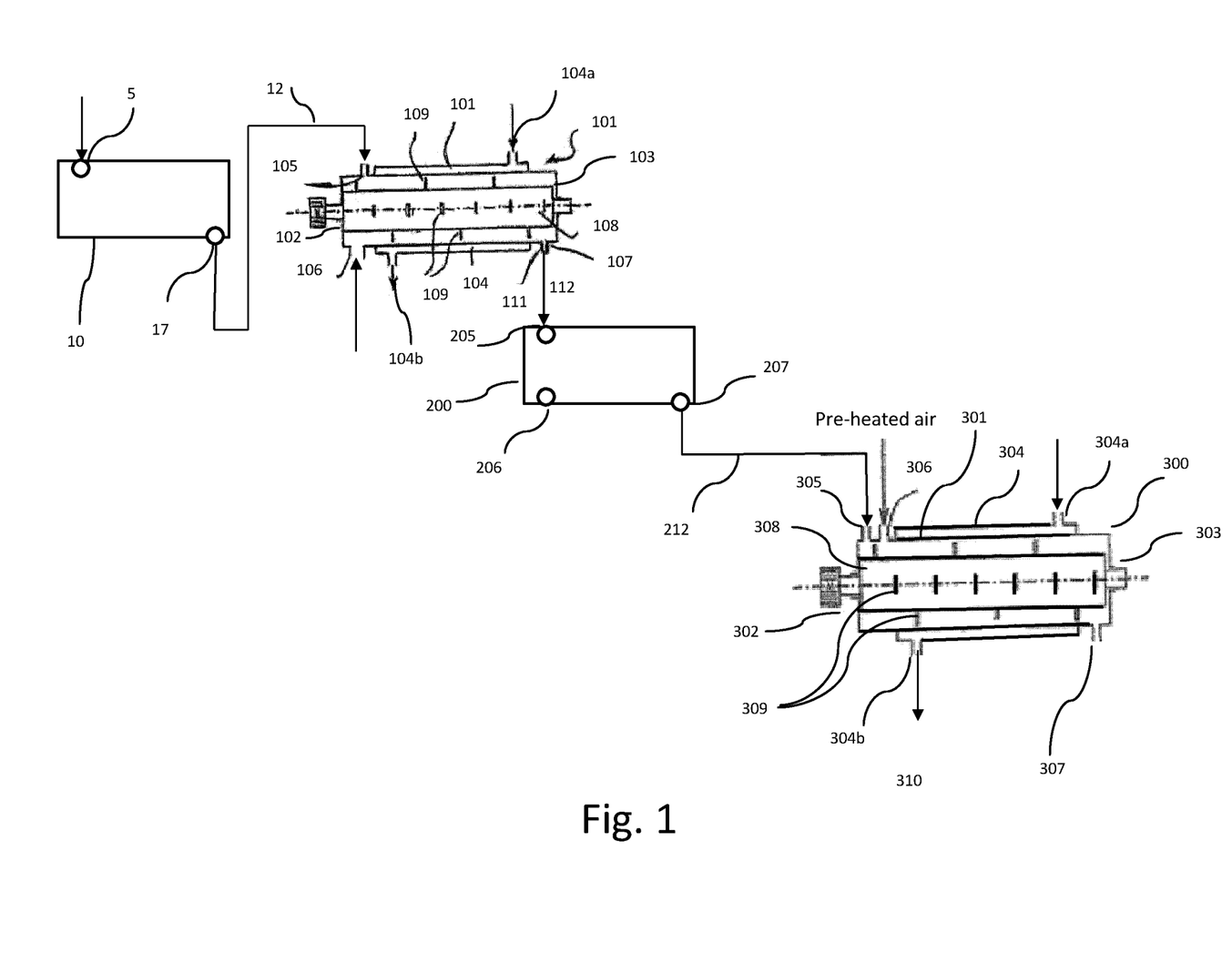
FIG. 1 shows a schematic view of a plant where the process according to the present invention can be carried out according to a preferred embodiment thereof.

A preferred embodiment of the process according to the present invention is described hereafter, which can be carried out in a plant illustrated in FIG. 1.

A falling film tubular evaporator 10 is first represented in a completely schematic manner. The evaporator 10 can be for example a multiple-effect evaporator, in which in a completely optional manner the above-mentioned preliminary vacuum concentration step can be performed.

The evaporator 10 comprises an outlet 17 for discharging a lactose-containing liquid preliminarily concentrated and having a dry matter content comprised between 55% and 65% by weight on its total weight.

Downstream of the evaporator 10 a turbo-concentrator 100 is positioned in fluid communication with the former through a pipe 12.

The turbo-concentrator 100 comprises a cylindrical tubular body 101, closed at opposite ends by bottom plates 102 and 103, and coaxially provided with a heating jacket 104, intended to be crossed by a thermal exchange fluid, for example diathermic oil, for keeping the inner wall of the cylindrical tubular body 101 at a pre-set temperature.

This heating jacket 104 has an inlet opening 104a and a discharge opening 104b, generally arranged for the inlet of the heated thermal exchange fluid and for the outlet of the cooled thermal exchange fluid, respectively.

The direction of the arrows drawn at the openings 104a and 104b exemplifies the direction of this incoming thermal exchange flow and this outgoing flow of the thermal exchange fluid, respectively.

The tubular body 101 is provided with inlet openings 105 and 106 for a continuous flow of a lactose-containing liquid.

In an entirely preferred manner, the opening 105 is in fluid communication with the outlet 17 of the evaporator 10 so as to be able to supply in the tubular body 101 of the turbo-concentrator 100 a lactose-containing fluid preliminarily concentrated for the following concentration step.

In contrast, the opening 106 is arranged for the introduction into the cylindrical body 101 of a fluid containing lactose and having a dry matter content comprised between 18% and 65% by weight on its total weight, which could not be subjected to a preliminary concentration step.

It is clear that, in the event that the plant does not envisage the presence of a preliminary concentrator 10 upstream of the turbo-concentrator 100, the latter can comprise a single inlet opening for the introduction of an above lactose-containing fluid.

The tubular body 101 pivotally supports therein a rotor comprising a shaft 108 equipped with radially projecting blade-shaped elements 109, these blades 109 being helicoidally oriented for centrifuging and simultaneously conveying towards a discharge opening 107 a flow of over-concentrated fluid product having a dry matter content comprised between 50% and 80% by weight on its total weight.

The direction of the arrows drawn at the openings 105, 106 and 107 exemplifies the direction of these incoming fluid flows and the outgoing flow of the so-concentrated fluid product, respectively.

In particular, when it enters the tubular body 101 of the turbo-concentrator 100, placed under vacuum, this continuous flow of lactose-containing liquid is centrifuged by the blades 109 of the rotor shaft against the inner wall of the cylindrical tubular body 101, which is heated by means of the heating jacket 104.

This turbo-concentrator 100 is therefore suitably arranged for performing the concentration step b).

A motor not being shown is suitably provided for the operation of the rotor of the turbo-concentrator 100 at variable speeds, which can be equal or higher than 100 rpm.

The discharge opening 107 is in fluid communication with a discharge pipe 112 in which a continuous flow of the over-concentrated lactose-containing fluid product is conveyed exiting the tubular body 101.

Once it has exited this turbo-concentrator 100, the flow of over-concentrated lactose-containing fluid product is continuously supplied to the mixer 200 through the inlet opening 205 for performing the mixing step c).

The mixer 200 is provided with a heating jacket 204 intended to be crossed by a thermal exchange fluid for keeping the over-concentrated fluid product therein at a pre-set temperature.

The mixer 200 is provided with inlet openings 205 and 206 for a continuous flow of this over-concentrated lactose-containing fluid product and for a continuous flow of lactose-containing powder having a dry matter content of at least 95% by weight on the total weight of this powder, respectively, as well as with a discharge opening 207.

A bladed shaft is installed inside the mixer 200, which is capable of centrifuging and simultaneously conveying towards the discharge opening 207 a flow of powdered mixture resulting from mixing the above two flows.

The discharge opening 207 is in fluid communication with a discharge pipe 212 in which a continuous flow of powdered mixture exiting the mixer 200 is conveyed.

The flow of powdered mixture can be finally supplied to a turbo-dryer 300 through an inlet opening 305 for performing the drying step d).

The turbo-dryer 300 comprises a cylindrical tubular body 301, closed at opposite ends by bottom plates 302, 303 and coaxially provided with a heating jacket 304 intended to be crossed by a fluid, for example a diathermic oil, for keeping the inner wall of the tubular body 301 at a pre-set temperature.

This heating jacket 304 has an inlet opening 304a and a discharge opening 304b, generally arranged for the inlet of the heated thermal exchange fluid and for the outlet of the cooled thermal exchange fluid, respectively.

The direction of the arrows drawn at the openings 304a and 304b exemplifies the direction of this incoming thermal exchange flow and this outgoing flow of the thermal exchange fluid, respectively.

The tubular body 301 is equipped with openings 305 and 306 for the inlet of the powdered mixture discharged from the discharge opening and of pre-heated hot air, respectively, as well as with a discharge opening 307.

The tubular body 301 pivotally supports therein a rotor comprising a shaft 308 equipped with blade-shaped elements 309 radially projecting therefrom, these blades 309 being helicoidally arranged and oriented for centrifuging and simultaneously conveying towards the discharge opening 307 the hot air flow and the so-dried powdered mixture, leading to the formation of a product in powder form containing lactose and having a dry matter content of at least 90% by weight on its total weight.

The turbo-dryer 300 is therefore suitably arranged for performing the drying step d).

Once it has exited the turbo-dryer 300, the flow of product in powder form containing lactose and having a high dry matter content can be continuously supplied to a separation unit not being represented, for example a screen, for the separation of a finer fraction of the product from a coarser fraction.

The fine fraction discharged from the screen advances towards a storage silo, not represented, while the coarser fraction is sent to a mill, not represented too, for the reduction of the particle size up to the desired values. The powder exiting the mill is then sent to the storage silo.

A mode for carrying out the process according to the invention is reported hereafter, carried out by the above-mentioned apparatus starting from a lactose-containing liquid available on the market.

Example 1

First of all, a preliminary concentration step is performed, supplying a whey flow with a quantity of dry matter of about 20% by weight on its total weight to a multiple-effect falling film tubular evaporator 10 (the total number of stages being equal to 3), provided by the company FARCK Spa.

The residence time inside the tubular evaporator 10 was of about 15 minutes with an advance speed of about 1000 L/h and with the following temperature profile, from the first to the third stage: 82° C./70° C./64° C.

The vacuum partial pressure was of 25000 Pa.

The liquid concentrate obtained at the outlet of the evaporator 10 contained a dry matter content of about 60% by weight on its total weight.

The liquid concentrate was then supplied, with a flow rate of 100 Kg/h to a turbo-concentrator 100 of the company Vomm, driving the rotor of the turbo-concentrator 100 at a speed of about 500 rpm and letting hot diathermic oil flow in the heating jacket 104, so as to bring the temperature inside the cylindrical tubular body 101 of the turbo-concentrator 100 to about 60° C.

The pressure inside the cylindrical tubular body 101 of the turbo-concentrator 100 was of about 15000 Pa.

The liquid concentrate was kept inside the turbo-concentrator 100 for a time of about 6 minutes.

An over-concentrated product having a dry matter content of about 75% by weight on its total weight was thereby obtained.

The over-concentrated product was discharged from the outlet 107 and then supplied to the mixer 200; the over-overconcentrated product was in form of the highly viscous fluid.

The over-overconcentrated fluid product was then subjected to a mixing step with a standard lactose-containing powder having a dry matter content of about 98% by weight, until a powdered mixture is obtained having a dry matter content of about 89% by weight on its total weight.

The mixing step was carried out for 10 minutes, at a temperature of 20° C. at the atmospheric pressure.

The bladed shaft of the mixer 200 is driven at a speed of 75 rpm for all the time of execution of the mixing step.

The powdered mixture was homogeneous and with a grainy appearance;

afterwards, it was discharged from the mixer 200 from the outlet 207, before being supplied (with the same flow rate) to a turbo-dryer 300 of the company Vomm.

A drying step was then performed inside the turbo-dryer 300: the powdered mixture was supplied through the inlet opening 305 and immediately centrifuged from the shaft 308 of the rotor driven into rotation at a speed of about 550 rpm, letting hot diathermic oil flow in the heating jacket 304, so as to bring the temperature inside the cylindrical tubular body 301 of the turbo-dryer 300 to about 150° C.

At the same time, an air flow (with a flow rate of about 1000 m³/h) pre-heated at the temperature of about 150° C. was supplied inside the cylindrical tubular body 301 of the turbo-dryer 300, through the inlet opening 306, in equicurrent with the flow of powdered mixture advancing inside the cylindrical tubular body 301 itself.

The drying step was carried out at the atmospheric pressure.

The powdered mixture was kept inside the turbo-dryer 300 for a time of about 8 minutes.

A product in powder form having a dry matter content of about 98% by weight on its total weight was thereby obtained.

The dry matter content of the above-mentioned product in powder form is calculated by using a thermo-balance at 80° C. for 180 minutes.

The lactose content inside the so-obtained product was of about 95% by weight on its total weight.

Example 2

The process according to the present invention in accordance with a different embodiment was then carried out.

A whey flow having a lactose content of about 56% by weight on its total weight and a dry matter content of 60% by weight on its total weight was continuously supplied (with a flow rate of 150 kg/h) through the opening 105 in the turbo-concentrator 100, inside which the rotor, comprising the bladed shaft 108, was driven into rotation at a speed of 900 rpm.

Immediately at the inlet of the turbo-concentrator 100, through the action of the bladed shaft 108, provided with the radially projecting elements 109, the whey flow was mechanically dispersed in particles which were immediately centrifuged.

Simultaneously, diathermic oil was flowed inside the heating jacket 104 at the temperature of 115° C., while the pressure inside the cylindrical tubular body 101 was kept at about 15000 Pa for the whole duration of the concentration step.

After a residence time of about 7 minutes inside the turbo-concentrator, an over-concentrated product with a dry matter content of 80% by weight on its total weight was continuously discharged from the opening 107.

The over-overconcentrated product was in the form of a highly viscous fluid.

The over-concentrated fluid product was then supplied in the mixer 200, through the inlet opening 205 with a flow rate of about 115 kg/h.

Simultaneously, a lactose-containing powder having a dry matter content of about 97% by weight, as well as a lactose content of 94% on its total weight, was added to the over-concentrated fluid product supplied in the mixer 200, which was mixed therewith.

In the mixer 200 the rotation speed of the bladed shaft was steadily kept at 100 rpm.

The pressure inside the mixer 200 was kept almost at the atmospheric pressure for the whole duration of the mixing step.

Afterwards, a flow of powdered mixture with a dry matter content of 90% was continuously discharged from the mixer 200.

Finally, the so-obtained powdered mixture was continuously supplied in the turbo-dryer 300, through the inlet opening 305 with a flow rate of about 345 kg/h, in equicurrent with an air flow pre-heated at a temperature of about 110° C., supplied through the inlet opening 306.

In the turbo-dryer 300, the wall temperature was kept at a value of 110° C., while the rotation speed of the rotor comprising the bladed shaft 308 was steadily kept a 900 rpm.

After a residence period of 2 minutes in the turbo-dryer 300, a flow of so-dried product in powder form was continuously discharged from the turbo-dryer 300, through the discharge opening 307.

The so-obtained product in powder form has a dry matter content of 97% by weight on its total weight, as well as a lactose content of 94% on its total weight, and it was a finely divided powder, featuring a high flowability and the crystalline appearance.

The experimental analyses conducted on the so-obtained product in powder form are shown hereafter; the product being concerned was characterized and compared with regard to its chemical-physical properties with those of a standard powder obtained by whey concentration and drying, specifically a product in powder form available on the market having a dry matter content of 97% by weight on its total weight and containing lactose in a quantity of about 95% by weight on its total weight.

Scanning Electron Microscope Analysis

Figure 2:
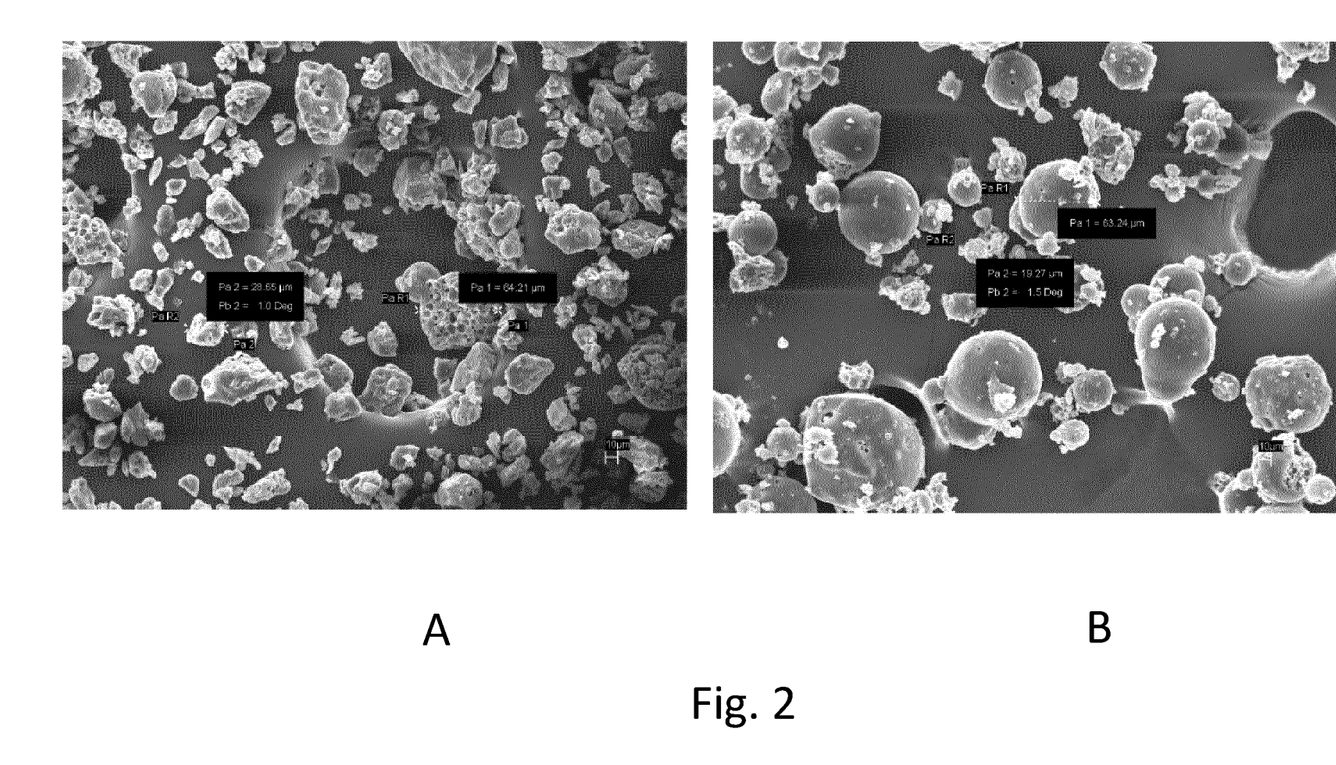
FIG. 2 shows SEM images of a powder sample according to the present invention (FIG. 2, A) and of a powder sample not according to the present invention (FIG. 2, B).

With reference to FIG. 2, a photograph (FIG. 2a) taken with a scanning electron microscope (SEM) of the above powder (magnification 250×) is first shown, obtained by carrying out the process according to the present invention (Example 2).

A photograph (FIG. 2b) (SEM, magnification 250×) of the above product in powder form available on the market (hereafter "standard powder") is shown alongside.

This standard powder was obtained by a spray-drying process.

As it is evident, the powder according to the present invention has particles with a particle size which is lower than 100 μm; the particles with a diameter which is lower than 10 μm are not many. In general, the particles have a quite compact shape, with a porous and ragged surface area.

In contrast, the particles of the above standard powder are split in two well differentiated categories: coarser globular-shaped particles with a size of about 50 μm, partially covered by particles having a size which is much lower than 20 μm.

As a whole, the particle size of the powder according to the present invention is higher than the globular-shaped particles of the above standard powder.

Specific Surface Area Assessment

The specific surface area values obtained by a BET analysis (Brunauer-Emmett-Teller) of a first and a second sample of the powder obtained in the example 2 are shown in the following Table 1; at the same time the specific surface area values obtained by a BET analysis of a first and a second sample of the above standard powder are shown.

BET analyses were performed according to the method USP 42 (United States Pharmacopeia, *Physical Tests, Specific Surface Area, Volumetric Method*), by weighting about 1 g of product in powder form, by introducing it in a sample tube, then placed under vacuum for 15 hours at 30° C. and, finally, by performing the BET analysis by means of the instrument SA3100 Surface Area Analyzer. The measurements were performed in duplicate.

TABLE 1

| Sample | Initial weight (g) | Net weight after vacuum (g) | BET specific surface area (m²/g) | Average BET specific surface area (m²/g) |
|---|---|---|---|---|
| Powder example 2 - first sample | 1.14053 | 1.11657 | 0.976 | 1.061 |
| Powder example 2 - second sample | 1.04053 | 1.01751 | 1.146 | |
| Standard powder - first sample | 0.72035 | 0.69078 | 1.649 | 1.7075 |
| Standard powder - second sample | 0.85113 | 0.83223 | 1.766 | |

As it is evident, the standard powder has a specific surface area which is significantly greater than the powder according to the present invention; specifically, the former has a specific surface area which is 60% higher than the specific surface area of the latter.

Bulk Density Assessment

The dispersed bulk density value of a sample of the powder according to the example 2 was calculated; at the same time the dispersed bulk density value of a sample of the above standard powder is reported herebelow.

The dispersed bulk density values were calculated by pouring into a hopper a quantity of material being enough to fill a cylinder with a volume of 100 cm³ placed therebelow.

A static sieve with a mesh size complying with the particle average size of the so-manipulated powder, that is a mesh which is large enough to prevent the sieve pores from being obstructed, was positioned 1.5-2 cm below the hopper discharge hole.

The cylinder filling operation was carried out at a temperature of 23° C. and under relative humidity conditions of 50%.

Advantageously, the dispersed bulk density calculated for the powder according to the example 2 was of 0.699 g/cm³, while the dispersed bulk density of the above standard powder was of 0.521 g/cm³.

Hygroscopicity Assessment

The hygroscopicity value of a sample of the powder according to the example 2 was determined; at the same time the hygroscopicity value of a sample of the above standard powder is reported hereafter.

The kinetic of water absorption was monitored over time after lyophilizing the samples for 48 hours, keeping the samples at 23° C. and 50% of relative humidity for a determined period of time.

Figure 3:
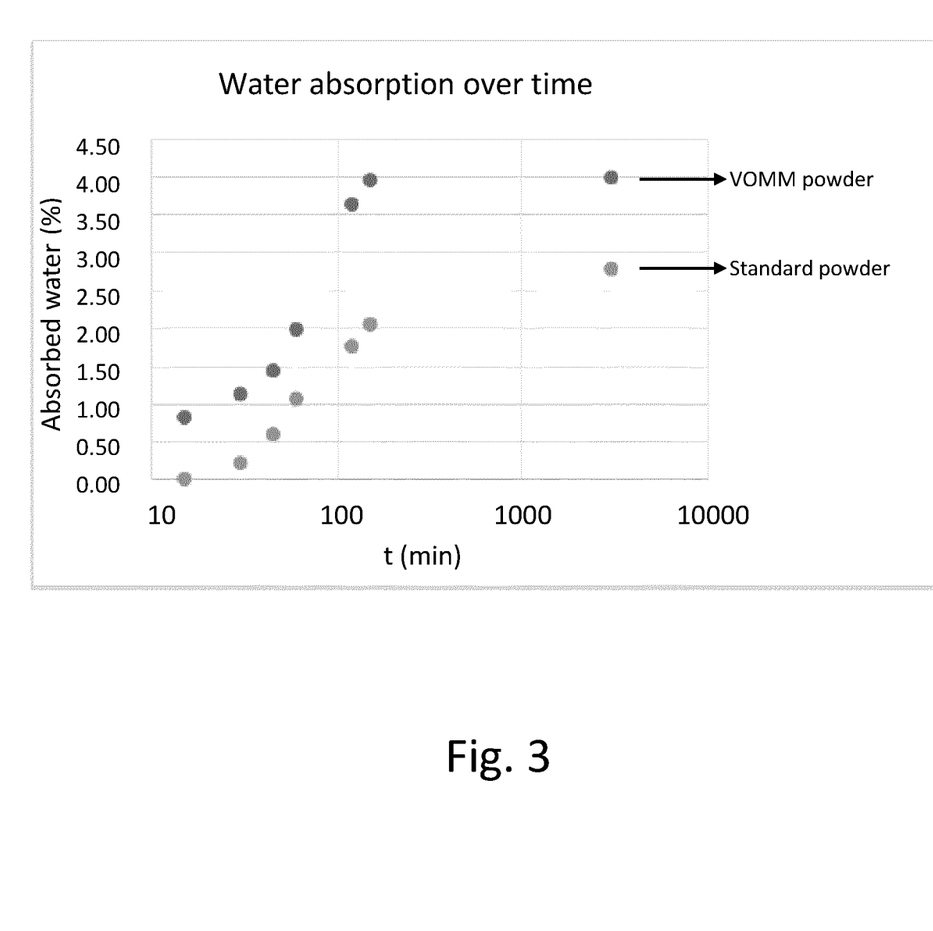
FIG. 3 shows a water absorption profile, assessed for a powder sample according to the present invention (points defining a lower curve) and, at the same time, a water absorption profile for a powder sample not according to the present invention (points defining an upper curve).

Specifically, the weight was assessed immediately after removing the sample from the lyophilizer (0.1 min) and after 15 minutes, 30 minutes, 45 minutes, 60 minutes, 120 minutes and 150 minutes. A last measurement was performed after 3030 minutes (i.e. about 2 days) to check if the moisture absorption had reached a plateau, indicating the equilibrium water content of the sample. The results are shown in FIG. 3 and in the following Table 2.

TABLE 2

| Time (minutes) | Water absorption (%) | |
|---|---|---|
| | Standard powder | Powder according to the example 2 |
| 0.1 | 0.00 | 0.00 |
| 15 | 0.84 | 0.02 |
| 30 | 1.14 | 0.23 |
| 45 | 1.44 | 0.60 |
| 60 | 1.99 | 1.08 |
| 120 | 3.65 | 1.76 |
| 150 | 3.96 | 2.06 |
| 3030 | 3.99 | 2.79 |

As shown, the powder according to the invention has a water absorption profile which is much slower than that of the standard powder. Advantageously, the water absorption of the powder according to the invention after 60 minutes and, in general, the overall one is lower than that of the standard powder.

Melting Enthalpy Assessment

The melting enthalpy of a sample of the powder according to the example 2 was calculated by the DSC (Differential Scanning calorimetry) technique under nitrogen atmosphere; moreover the melting enthalpy value of a sample of the above standard powder was calculated by DSC.

The instrument used was the calorimeter Mettler Toledo DSC1 according to the following temperature program: from 25° C. to 250° C. with a gradient of 10° C./minute.

The melting enthalpy value calculated for the powder according to the example 2 was of −112.78 J/g, while the melting enthalpy value calculated for the above standard powder was of −75.36 J/g.

Figure 4:
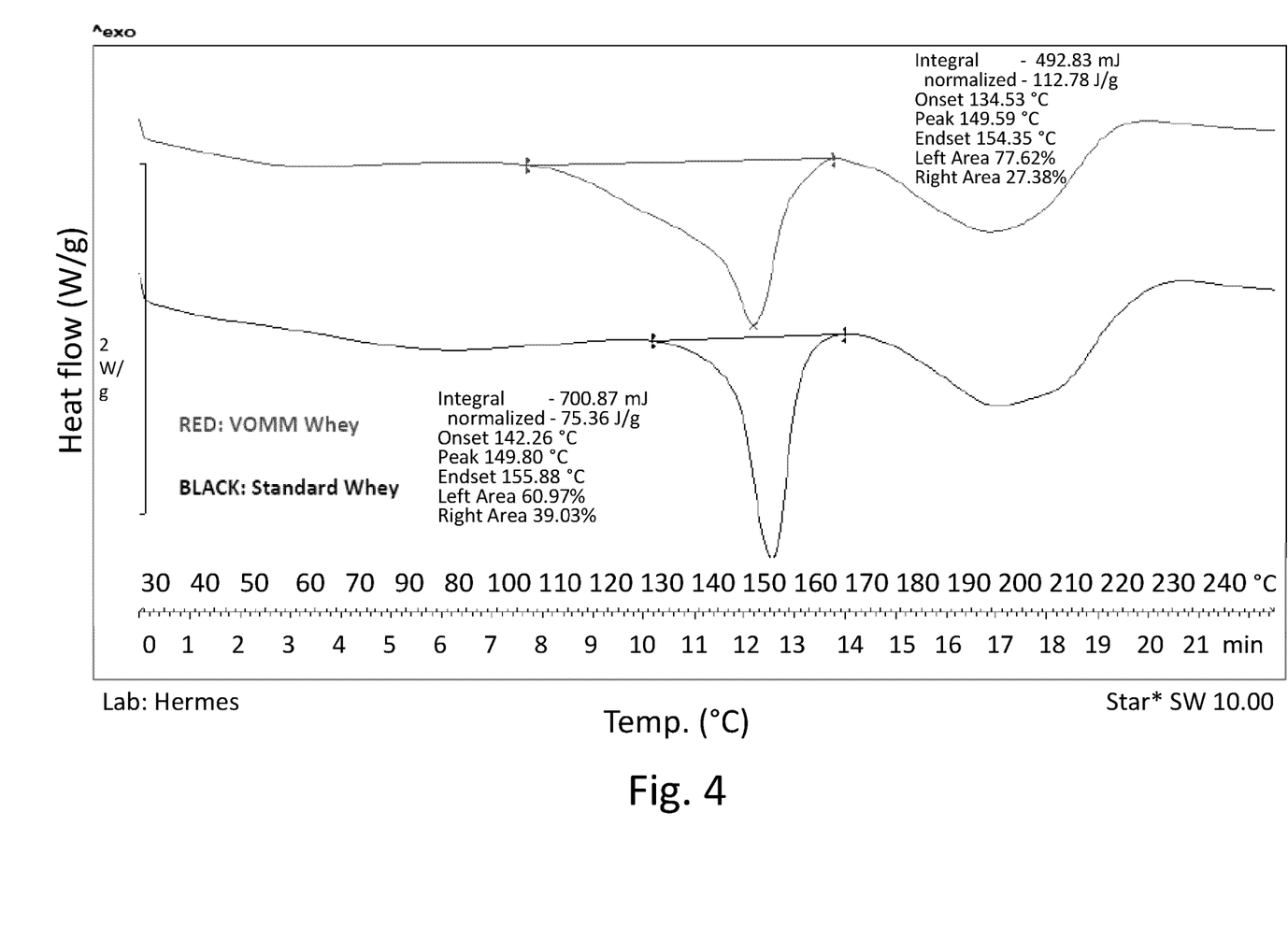
FIG. 4 shows a pair of thermograms for a powder sample according to the present invention (curve at the top) and for a powder sample not according to the present invention (curve at the bottom).

In particular, the thermograms calculated for the above two samples are shown in FIG. 4.

From FIG. 4, it can be derived that the powder as obtained from Example 2 mainly comprises α-Lactose monohydrate.

In conclusion, in view of the markedly higher melting enthalpy value for the powder according to the present invention compared to the standard powder, it can be stated that the powder according to the present invention has a substantially higher level of crystallinity compared to the standard powder.

The invention claimed is:

1. Process for the production of a lactose-containing product in powder form having a dry matter content of at least 90% by weight on its total weight and comprising lactose in a quantity of at least 85% by weight on its total weight, wherein said product has a dispersed bulk density which is greater or equal to 0.65 g/cm³, said process comprising the steps of:
 a) providing a lactose-containing liquid having a dry matter content between 18% and 65% by weight on its total weight;
 b) concentrating said lactose-containing liquid at a temperature between 55° C. and 200° C., for a time comprised between 1 minute and 10 minutes and at a pressure which is lower or equal to 20000 Pa, until an over-concentrated fluid product having a dry matter content between 50% and 80% by weight on its total weight is obtained;
 c) mixing the over-concentrated fluid product obtained by the previous step with a lactose-containing powder having a dry matter content of at least 95% by weight on its total weight, until a powdered mixture having a dry matter content of at least 85% by weight on its total weight is obtained;
 d) drying said powdered mixture until said product in powder form having a dry matter content of at least 90% by weight on its total weight and containing lactose in a quantity of at least 85% by weight on its total weight is obtained, thereby obtaining fully formed crystals of α-lactose monohydrate, and said product in powder form being characterized by a melting enthalpy between −105 J/g and −125 J/g;

wherein said concentration step b) comprises the following steps:

providing a turbo-concentrator comprising a cylindrical tubular body having an inlet opening and a discharge opening, a heating jacket to bring the cylindrical tubular body to a predetermined temperature value, and a rotor, arranged in the cylindrical tubular body and comprising a shaft provided with elements radially projecting therefrom;

supplying a continuous flow of said lactose-containing liquid in the turbo-concentrator, so as to form, through the action of the rotor, a turbulent film continuous flow;

centrifuging the lactose-containing liquid against the inner wall of the turbo-concentrator, the rotor being driven into rotation at a speed which is higher or equal to 100 rpm, with formation of a highly turbulent, dynamic, thin tubular fluid film, the turbulent film of the lactose-containing liquid advancing in substantial contact with the inner wall of the turbo-concentrator towards the discharge opening, so as to obtain said over-concentrated fluid product; and, discharging from the discharge opening a continuous flow of over-concentrated fluid product.

2. Process according to claim 1, wherein the lactose-containing liquid provided during said step a) is a concentrated liquid having a dry matter content comprised between 55% and 65% by weight on its total weight.

3. Process according to claim 1, wherein the lactose-containing liquid provided during step a) is a product or by-product of the milk-dairy industry.

4. Process according to claim 1, wherein step b) is carried out at a pressure comprised between 15000 Pa and 11000 Pa.

5. Process according to claim 1, wherein step b) is carried out at a temperature comprised between 55° C. and 120° C.

6. Process according to claim 1, wherein in said mixing step c) the over-concentrated fluid product is mixed with a lactose-containing powder having a dry matter content of at least 97% by weight on its total weight.

7. Process according to claim 1, wherein in mixing step c) the over-concentrated fluid product is mixed with a lactose-containing powder produced during the drying step d) of a previous cycle for carrying out the process.

8. Process according to claim 1, wherein in said drying step d) the lactose-containing product in powder form has a dry matter content between 90% and 99% by weight on its total weight.

9. Process according to claim 1, wherein the drying step d) comprises the following steps:

providing a turbo-dryer comprising a cylindrical tubular body having an inlet opening and a discharge opening, a heating jacket to bring the cylindrical tubular body to a predetermined temperature value, and a rotor, arranged in the cylindrical tubular body and comprising a shaft provided with elements radially projecting therefrom;

supplying a continuous flow of said powdered mixture in this turbo-dryer;

centrifuging the powdered mixture against the inner wall of the turbo-dryer, the rotor being driven into rotation at a speed which is higher or equal to 100 rpm, the particles of the powdered mixture advancing in substantial contact with the inner wall of the turbo-dryer towards the discharge opening, so as to form said product in powder form; and, discharging from the discharge opening the product in powder form.

10. Process according to claim 9, wherein drying step d) is carried out bringing the cylindrical tubular body the turbo-dryer to a temperature between 40° C. and 200° C. by heating its inner wall by means of said heating jacket.

11. Process according to claim 1, wherein said drying step d) is performed at the atmospheric pressure.

12. Process according to claim 1, wherein said process is carried out continuously.

13. Process according to claim 3, wherein the lactose-containing liquid provided during step a) is a product or by-product of the milk-dairy industry selected from skimmed milk, semi-skimmed milk, whole milk, whey, permeate obtained by membrane filtration of milk or permeated obtained by membrane filtration of whey.

* * * * *